(12) United States Patent
Hooton et al.

(10) Patent No.: US 9,575,392 B2
(45) Date of Patent: Feb. 21, 2017

(54) ELECTRONIC DEVICE WITH CAMERA FLASH STRUCTURES

(71) Applicant: Apple Inc., Cupertino, CA (US)

(72) Inventors: Lee E. Hooton, Cupertino, CA (US); Kelvin Kwong, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 688 days.

(21) Appl. No.: 13/760,930

(22) Filed: Feb. 6, 2013

(65) Prior Publication Data

US 2014/0219646 A1    Aug. 7, 2014

(51) Int. Cl.
G03B 15/03      (2006.01)
G03B 17/02      (2006.01)
G03B 31/00      (2006.01)

(52) U.S. Cl.
CPC ............... *G03B 15/03* (2013.01); *G03B 17/02* (2013.01); *G03B 31/00* (2013.01); *G03B 2215/0503* (2013.01)

(58) Field of Classification Search
CPC ......... G03B 15/03; G03B 31/00; G03B 17/02; G03B 2215/0503
USPC ........................................................ 396/176
See application file for complete search history.

(56) References Cited

U.S. PATENT DOCUMENTS

| 7,482,574 | B2 | 1/2009 | Wang |
| 8,301,024 | B2 | 10/2012 | Mather et al. |
| 2008/0165116 | A1* | 7/2008 | Herz et al. .................. 345/102 |
| 2011/0255000 | A1 | 10/2011 | Weber et al. |
| 2012/0014683 | A1 | 1/2012 | Gudlavalleti et al. |
| 2012/0086801 | A1 | 4/2012 | Larsen |
| 2013/0272021 | A1* | 10/2013 | Kirino ................. F21V 33/008 362/605 |
| 2014/0152890 | A1* | 6/2014 | Rayner ................. G06F 1/1626 348/376 |

FOREIGN PATENT DOCUMENTS

JP       2012105774 A  *  6/2012

OTHER PUBLICATIONS

Translation of 2012105774.*

* cited by examiner

*Primary Examiner* — Rochelle-Ann J Blackman
(74) *Attorney, Agent, or Firm* — Treyz Law Group, P.C.; G. Victor Treyz; Jospeh F. Guihan

(57) ABSTRACT

An electronic device may contain a camera, a camera flash, and a display in a housing. The camera flash or the display may provide illumination while capturing images with camera. The camera flash may be formed from light guiding structures that receive camera flash light from a light source. The camera flash may be located under a speaker port mesh. A speaker port may contain a camera and a camera flash. Light guiding structures may have a ring shape with an opening. A speaker port, camera, or button may be located within the opening. A button may have an opaque portion in which a transparent light guiding structure for a camera flash is embedded. Camera flash structures may produce camera flash light to capture images and can serve as a status indicator to indicate when a message is received or other state change is detected during operation.

31 Claims, 18 Drawing Sheets

1

ELECTRONIC DEVICE WITH CAMERA FLASH STRUCTURES

BACKGROUND

This relates generally to electronic devices and, more particularly, to electronic devices with cameras and camera flash structures.

Electronic devices such as cellular telephones and other devices often contain cameras. A camera may be used in acquiring still and moving images. Flash structures based on light sources such as light-emitting diodes are incorporated into electronic devices to provide illumination for a subject during camera use.

Challenges arise when mounting flash structures in an electronic device. If care is not taken, flash structures may be bulky and obtrusive. Flash structures that are mounted poorly may detract from an otherwise aesthetically appealing device appearance.

It would therefore be desirable to be able to provide electronic devices with improved arrangements for mounting camera and flash structures.

SUMMARY

An electronic device may contain a camera and a camera flash. A display may be mounted in an electronic device housing for the electronic device. The display may, for example, be mounted on a front face of the electronic device housing. The camera and the camera flash may be mounted on the front face of the electronic device housing or other surface of the electronic device.

The camera flash or the display may provide illumination while capturing images with the camera. The camera flash may be formed from light-guiding structures that receive camera flash light from a light source. The light-guiding structures may be formed from a transparent material such as clear plastic or glass.

The camera flash may be located under a speaker port mesh. If desired, a speaker port opening in a display may contain a camera and a camera flash.

Light-guiding structures may have a ring shape with an opening. A speaker port, camera, or button may be located within the opening in the light-guiding structures. A metal coating or other opaque or reflective coating may be provided on exterior portions of the light-guiding structure to reduce stray light.

The electronic device may have buttons with which a user of the electronic device supplies input to control circuitry within the electronic device. A button may have an opaque portion in which a transparent light-guiding structure for a camera flash is embedded.

Camera flash structures may produce camera flash light to capture images and can serve as a status indicator to indicate when a message is received or when the control circuitry has detected other state changes during operation of the electronic device.

Further features, their nature and various advantages will be more apparent from the accompanying drawings and the following detailed description of the preferred embodiments.

DETAILED DESCRIPTION

Figure 1:
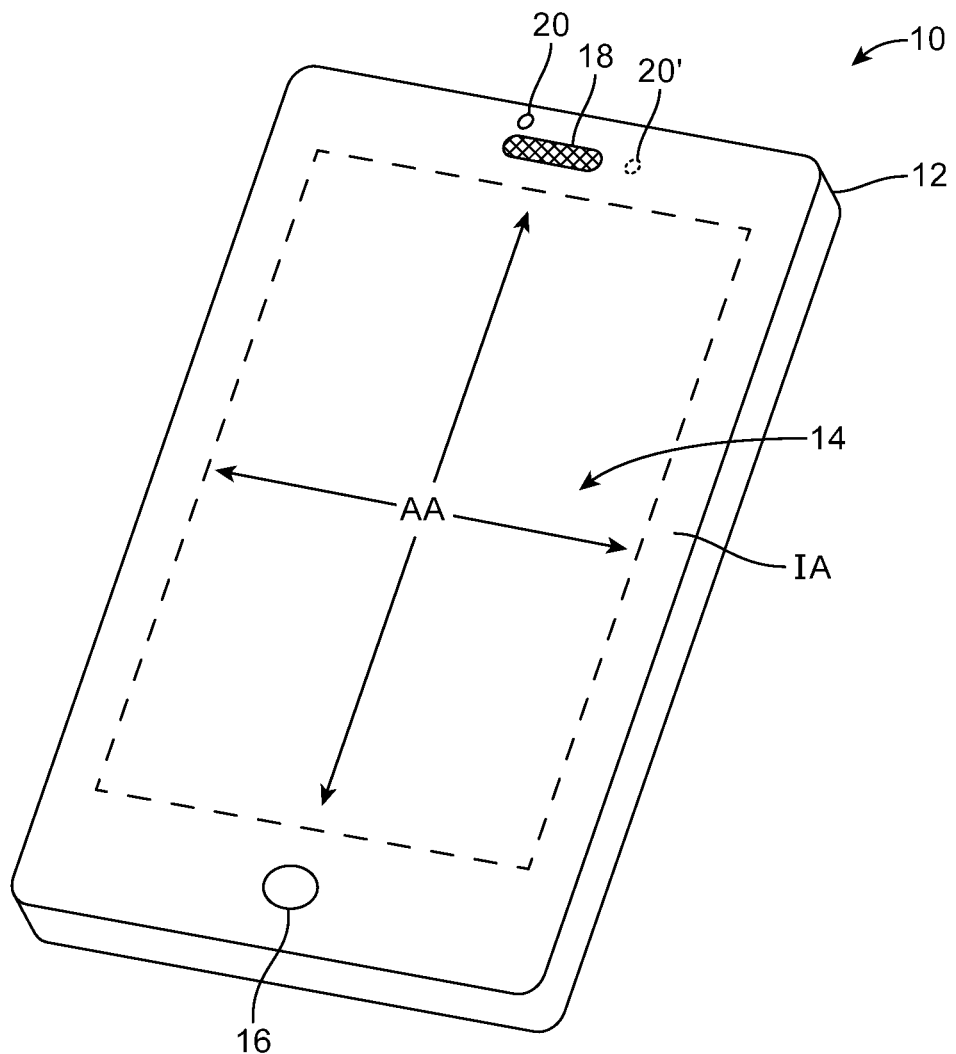
FIG. 1 is a perspective view of an illustrative electronic device of the type that may be provided with camera and camera flash structures in accordance with an embodiment.

An illustrative electronic device that may be provided with camera and camera flash structures is shown in FIG. 1.

Electronic devices such as device 10 of FIG. 1 may be cellular telephones, media players, other handheld portable devices, somewhat smaller portable devices such as wristwatch devices, pendant devices, or other wearable or miniature devices, gaming equipment, tablet computers, notebook computers, desktop computers, televisions, computer monitors, computers integrated into computer displays, or other electronic equipment.

In the example of FIG. 1, device 10 includes a display such as display 14. Display 14 has been mounted in a housing such as housing 12 (i.e., in the front face of housing 12). Housing 12, which may sometimes be referred to as an enclosure or case, may be formed of plastic, glass, ceramics, carbon-fiber materials and other fiber composites, metal (e.g., stainless steel, aluminum, etc.), other suitable materials, or a combination of any two or more of these materials. Housing 12 may be formed using a unibody configuration in which some or all of housing 12 is machined or molded as a single structure or may be formed using multiple structures (e.g., an internal frame structure, one or more structures that form exterior housing surfaces, etc.).

Display 14 may be a touch screen display that incorporates a layer of conductive capacitive touch sensor electrodes or other touch sensor components (e.g., resistive touch sensor components, acoustic touch sensor components, force-based touch sensor components, light-based touch sensor components, etc.) or may be a display that is not touch-sensitive. Capacitive touch screen electrodes may be formed from an array of indium tin oxide pads or other transparent conductive structures.

Display 14 may include an array of display pixels formed from liquid crystal display (LCD) components, an array of electrophoretic display pixels, an array of plasma display pixels, an array of organic light-emitting diode display pixels, an array of electrowetting display pixels, or display pixels based on other display technologies. Display 14 may include transparent substrate layers such as thin-film transistor substrate layers, color filter layers, and other transparent layers. The brightness of display 14 may be adjustable. For example, display 14 may include a backlight unit formed from a light source such as a lamp or light-emitting diodes that can be used to increase or decrease display backlight levels and thereby adjust display brightness. Display 14 may also include organic light-emitting diode pixels or other pixels with adjustable intensities. In this type of display, display brightness can be adjusted by adjusting the intensities of drive signals used to control individual display pixels.

Display 14 may be protected using a display cover layer such as a layer of transparent glass, clear plastic, or other transparent layer. Openings may be formed in the display cover layer. For example, an opening may be formed in the display cover layer to accommodate a button such as button 16. An opening may also be formed in the display cover layer to accommodate ports such as speaker port 18.

In the center of display 14, display 14 may contain an array of active display pixels. This region is sometimes referred to as the active area of the display. As shown in FIG. 1, active area AA of display 14 may have a rectangular shape. A rectangular ring-shaped region surrounding the periphery of the active display region may not contain any active display pixels and may therefore sometimes be referred to as the inactive area of the display (see, e.g., inactive area IA of FIG. 1). The display cover layer or other display layers in display 14 may be provided with an opaque masking layer in the inactive region to hide internal components from view by a user. For example, the inner surface of the display cover layer in inactive area IA may be covered with a layer of black ink or other opaque masking material.

Openings may be formed in the opaque masking layer to accommodate speaker port 18 and other components. For example, openings may be provided in the opaque masking layer in inactive area IA of display 14 to accommodate cameras, camera flashes, and other components. A circular opening in the opaque masking layer or other opening in the opaque masking layer may be used to form a camera window such as camera window 20. Camera window 20 may be located above speaker port 18 as shown in FIG. 1 or may be located elsewhere in device 10 (see, e.g., illustrative camera window 20' of FIG. 1). Camera flash structures may be provided for device 10 that emit camera flash light through portions of camera window 20 or camera flash structures may be provided that emit camera flash light through other portions of device 10.

Figure 2:
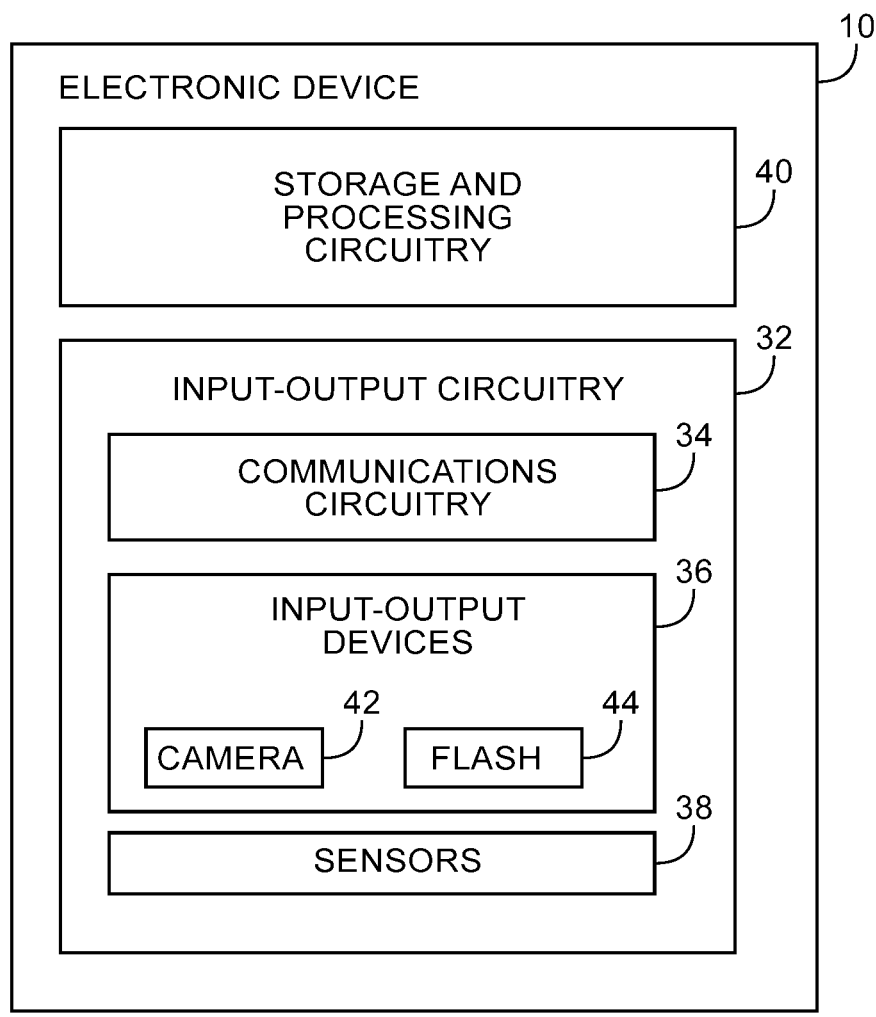
FIG. 2 is a schematic view of an illustrative electronic device of the type that may be provided with camera and camera flash structures in accordance with an embodiment.

A schematic diagram of device 10 is shown in FIG. 2. As shown in FIG. 2, electronic device 10 may include control circuitry such as storage and processing circuitry 40. Storage and processing circuitry 40 may include one or more different types of storage such as hard disk drive storage, nonvolatile memory (e.g., flash memory or other electrically-programmable-read-only memory), volatile memory (e.g., static or dynamic random-access-memory), etc. Processing circuitry in storage and processing circuitry 40 may be used in controlling the operation of device 10. The processing circuitry may be based on a processor such as a microprocessor and other suitable integrated circuits. With one suitable arrangement, storage and processing circuitry 40 may be used to run software on device 10 such as internet browsing applications, email applications, media playback applications, operating system functions, software for capturing and processing images while using camera flash structures to emit camera flash light to provide illumination for the images, software implementing functions associated with gathering and processing sensor data, software that makes adjustments to display brightness and touch sensor functionality, software that detects user input such as button press events and that detects state changes in device 10 related to messages and other communications functions, etc.

Input-output circuitry 32 may be used to allow input to be supplied to device 10 from a user or external devices and to allow output to be provided from device 10 to the user or external devices.

Input-output circuitry 32 may include wired and wireless communications circuitry 34. Communications circuitry 34 may include radio-frequency (RF) transceiver circuitry formed from one or more integrated circuits, power amplifier circuitry, low-noise input amplifiers, passive RF components, one or more antennas, and other circuitry for handling RF wireless signals. Wireless signals can also be sent using light (e.g., using infrared communications).

Input-output circuitry 32 may include input-output devices 36 such as button 16 of FIG. 1, joysticks, click wheels, scrolling wheels, a touch screen such as display 14 of FIG. 1, other touch sensors such as track pads or touch-sensor-based buttons, vibrators, audio components such as microphones and speakers, image capture devices such as a camera module having an image sensor and a corresponding lens system (e.g., camera 42), light-emitting-diode structures, lamp structures, or other camera flash structures such as camera flash 44 for providing illumination for a subject when capturing images with camera (i.e., while camera 42 receives image light), keyboards, status-indicator lights, tone generators, key pads, and other equipment for gathering input from a user or other external source and/or generating output for a user.

Sensor circuitry such as sensors 38 of FIG. 2 may include an ambient light sensor for gathering information on ambient light levels, proximity sensor components (e.g., light-based proximity sensors and/or proximity sensors based on other structures), accelerometers, gyroscopes, magnetic sensors, and other sensor structures.

Device 10 may be provided with cameras such as camera(s) 42 of FIG. 2 on the front of housing 12 (i.e., the exposed display surface of housing 12 shown in FIG. 1), on a side of housing 12, or on the rear surface of housing 12. Configurations in which device 10 has at least a front-facing camera (i.e., in which camera 42 is a front-facing camera) are sometimes described herein as an example. This is, however, merely illustrative. Cameras in device 10 may be mounted in any suitable location within housing 12 of device 10.

Device 10 may be provided with camera flash structures 44 that enhance device aesthetics while ensuring that sufficient flash light is available for a user of a camera in device 10. Camera 42 and camera flash structures 44 may be mounted on device 10 in a location such as the front of housing 12 (as an example).

Figure 3:
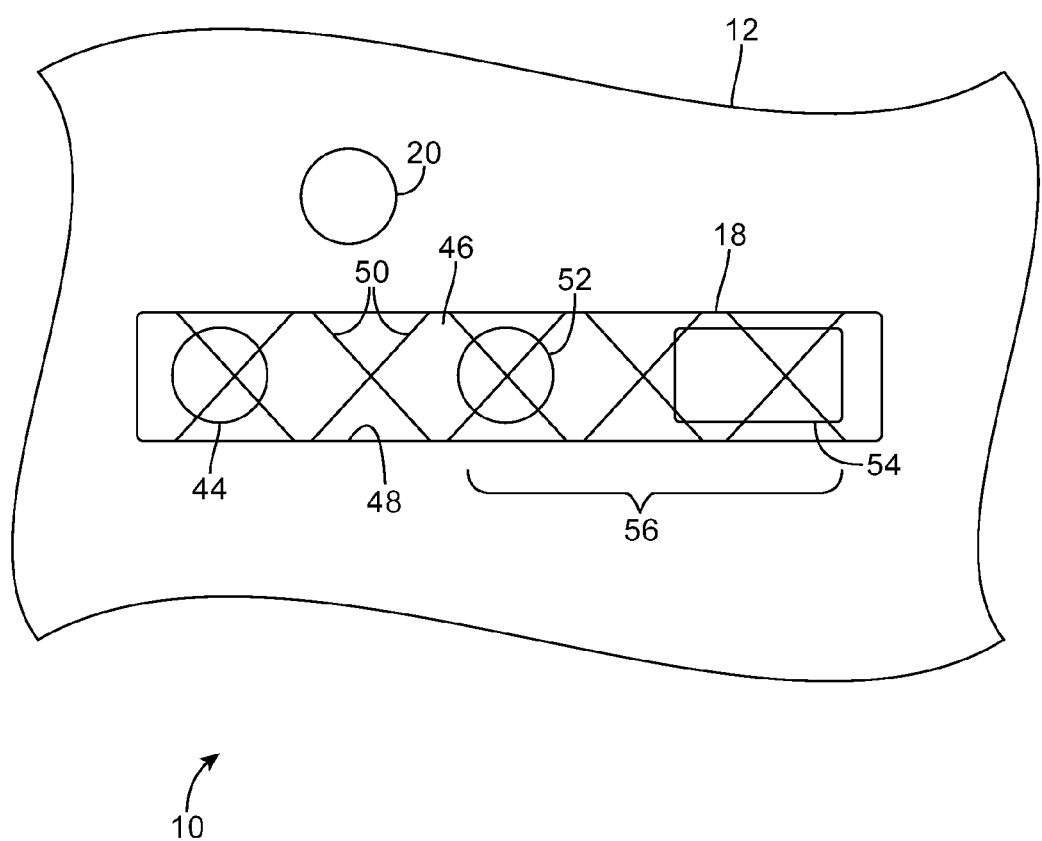
FIG. 3 is a top view of a portion of an electronic device in which a camera flash has been mounted within a speaker port in accordance with an embodiment.

With one suitable arrangement, camera flash structures 44 may be mounted within speaker port 18. This type of configuration is shown in FIG. 3. As shown in FIG. 3, housing 12 of device 10 has camera window 20. Camera 42 is mounted in alignment with camera window 20 so that images may be acquired through camera window 20 (i.e., so that a digital image sensor in camera 42 can be used by camera 42 to receive image light through camera window 20). Speaker port 18 is formed from opening 46 in housing 12 (i.e., an opening in the display cover layer that covers display 14 on the front face of housing 12 for device 10 or an opening in other display layers). Opening 46 may have an elongated rectangular shape with rounded ends as shown in FIG. 3 or may have other suitable shapes (e.g., a circular shape, an oval shape, a rectangular shape, a square shape, a shape with a combination of straight and curved edges, etc.).

Speaker port 18 has peripheral edge 48. Peripheral edge 48 runs around the periphery of opening 46. Mesh 50 or other suitable audio-transparent covering may overlap opening 46. Audio-transparent coverings may be formed from plastic, metal, fiber-based composites, other materials, or combinations of these materials. As an example, an audio-transparent covering for speaker port 18 may be formed from one or more layers of mesh 50 such as one or more plastic layers of mesh and/or one or more layers of metal mesh. Mesh 50 contains strands of fiber such as plastic or metal fiber arranged in a grid pattern such as a rectangular grid, a grid with diagonally intersecting fibers, or a grid with fibers arranged in other mesh patterns. The spaces between the strands of fiber in mesh 50 form openings through which sound can pass for audio components 56. Audio components 56 may include components such as speaker 54 and microphone 52 (e.g., a noise cancellation microphone or a voice microphone).

The spaces between the strands of fiber in mesh 50 also form openings through which light can pass for optical components such as light-emitting diodes, lamps, or other sources of light. As an example, one or more flash structures such as camera flash structures 44 may be located under mesh 50, as shown in FIG. 3. By configuring device 10 so that mesh 50 overlaps flash structures 44, flash structures 44 may be at least somewhat hidden from view by a user of device 10, thereby enhancing device aesthetics. During use of camera 42, flash 44 can emit camera flash light that passes through mesh 50 to illuminate a subject. Camera 42 may then acquire an image of the subject that has been illuminated in this way. Camera 42 may be located under camera window 20 or elsewhere in device 10.

Figure 4:
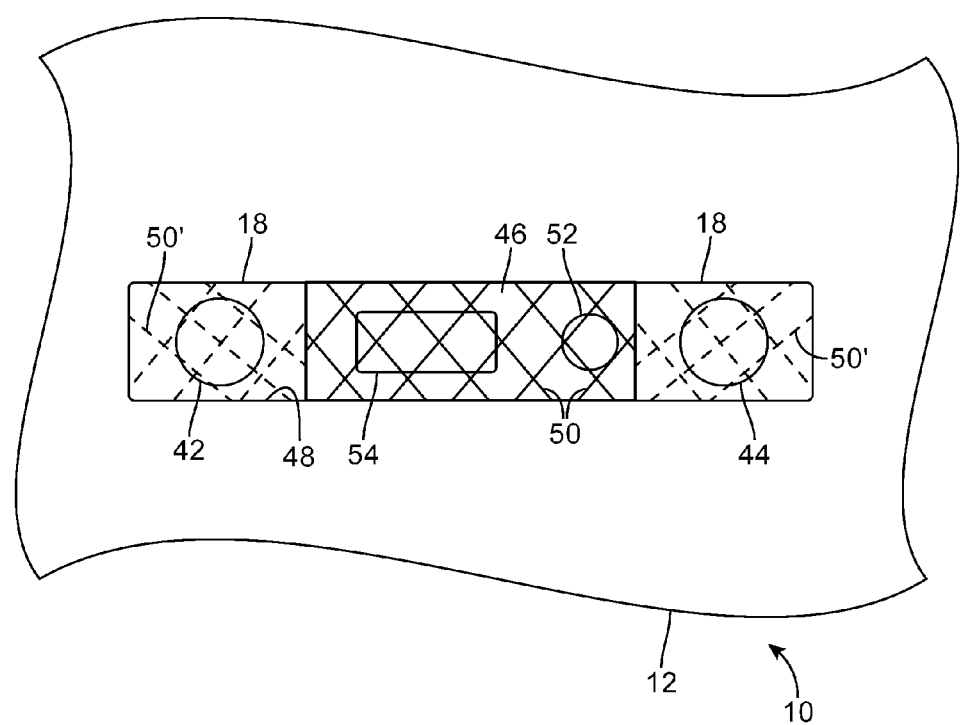
FIG. 4 is a top view of a portion of an electronic device in which a camera and camera flash have been mounted at opposing ends of an elongated housing opening forming a speaker port in accordance with an embodiment.

If desired, camera 42 and camera flash 44 may both be located within port 18. In the illustrative configuration of FIG. 4, camera 42 has been located in the left-hand end of opening 46 for port 18 and camera flash 44 has been located in the right-hand end of port 18. Mesh 50 may cover audio components such as speaker 54 and microphone 52. If desired, mesh 50 may be extended to cover all of opening 46 in port 18, as shown by dashed lines 50' over camera 42 and camera flash 44.

Figure 5:
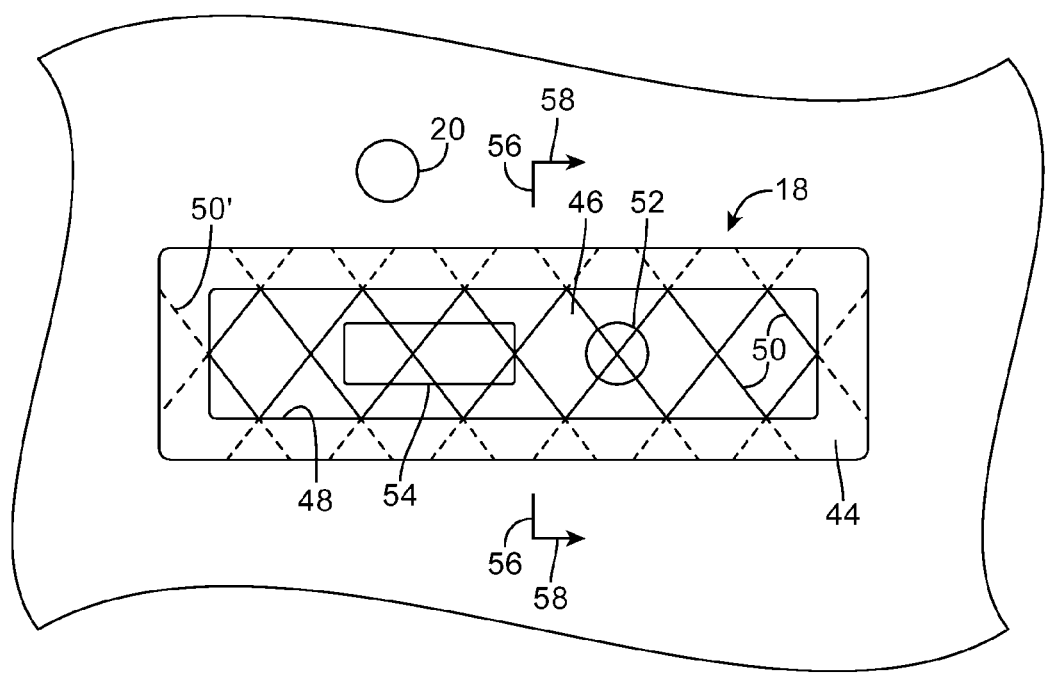
FIG. 5 is a top view of a portion of an electronic device in which camera flash structures run along a peripheral edge of a speaker port in accordance with an embodiment.

FIG. 5 is a top view of an illustrative configuration for speaker port 18 in which camera flash 44 has the shape of a rectangular ring running around peripheral edge 48 of speaker port opening 46. Camera 42 may be mounted within housing 12 in alignment with camera window 20. Mesh 50 overlaps speaker 54 and optional microphone 52. If desired, mesh 50 may be extended to overlap camera flash 44, as indicated by dashed lines 50'. In the FIG. 5 example, camera flash 44 surrounds opening 46. This is merely illustrative. Camera flash 44 may be formed from a light-emitting structure that runs along edge 48 of opening 46 for a portion of the periphery of opening 46.

Camera flash structures 44 may be formed from a ring of plastic or other suitable material that serves as a light guiding structure and may include a light source such as a light-emitting diode structure. During use of camera flash structures 44, the light-emitting diode or other light source emits light that serves as camera flash light. The light guiding structures guide the emitted light from the light-emitting diode so that the emitted light is directed outwards from the front face of electronic device 10.

Figure 6:
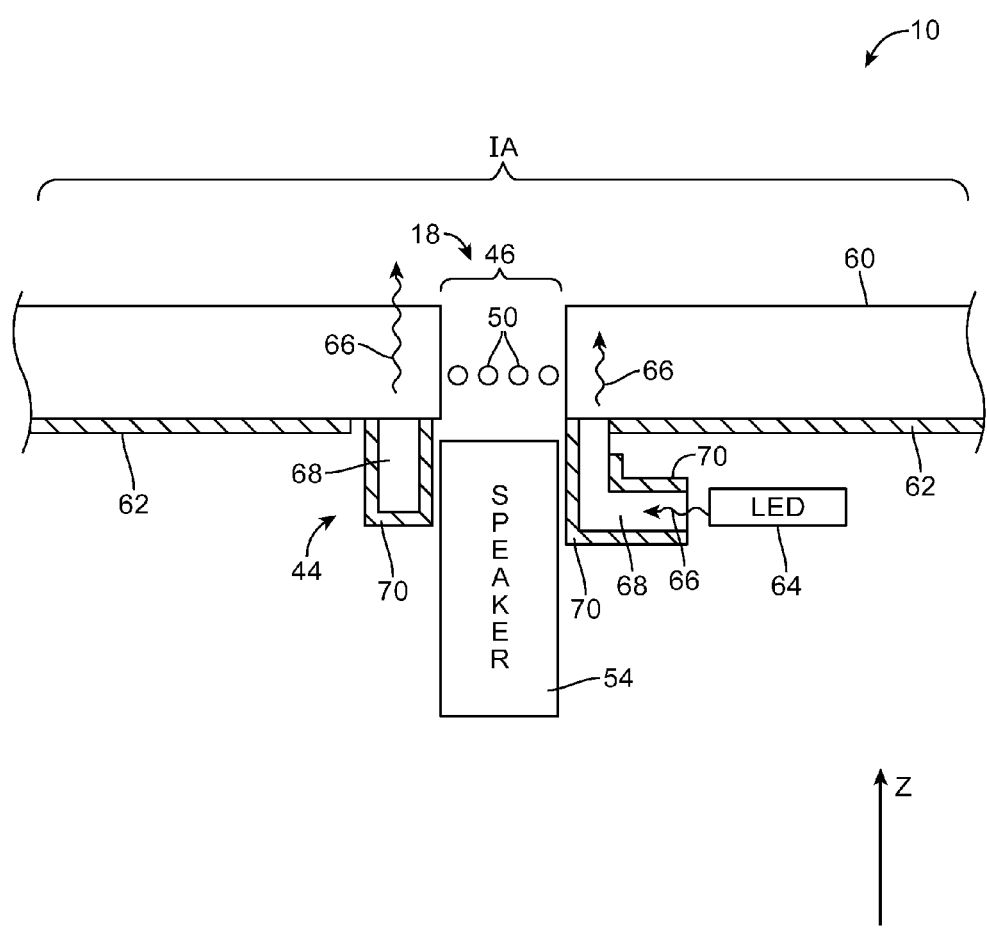
FIG. 6 is a cross-sectional side view of illustrative camera flash structures having a light guide ring for directing light from a light-emitting diode outwards through a display in a ring-shaped speaker port configuration of the type shown in FIG. 5 in accordance with an embodiment.

A cross-sectional side view of camera flash structures 44 of FIG. 5 taken along line 56 and viewed in direction 58 is shown in FIG. 6. As shown in FIG. 6, speaker port 18 is formed from opening 46 in display cover layer 60 in inactive region IA of display 14. The inner surface of display cover layer 60 is covered with opaque masking material 62 such as black ink to hide internal device components from view by a user of device 10. Camera flash structures 44 include light source 64 and light guiding structures 68.

Light source 64 may be a light-emitting diode or an array of light-emitting diodes or other source of light 66. During operation of device 10, a user may direct camera 42 to acquire images. When illumination from camera flash structures 44 is desired, light source 64 may be directed to produce light 66 by control circuitry 40.

Light guiding structures 68 are formed from a transparent material such as clear plastic or glass. Light guiding structures 68 may be configured to receive light 66 from light source 64 and to redirect light 66 upwards in direction Z through display cover layer 60 (i.e., through an opening in opaque masking layer 62 on the inner surface of display cover layer 60 or other display layer) to serve as camera flash light for camera flash structures 44. If desired, light guiding structures 68 may be provided with a coating such as coating 70. Coating 70 may be a reflective layer formed from a multilayer dielectric coating and/or one or more metal layers to help reflect light upwards in direction Z without allowing stray light to escape. If desired, coating 70 may be formed form a material such as black ink that is opaque. Using a reflective and/or an opaque non-reflective coating, stray light from light guiding structures 68 can be suppressed.

Figure 7:
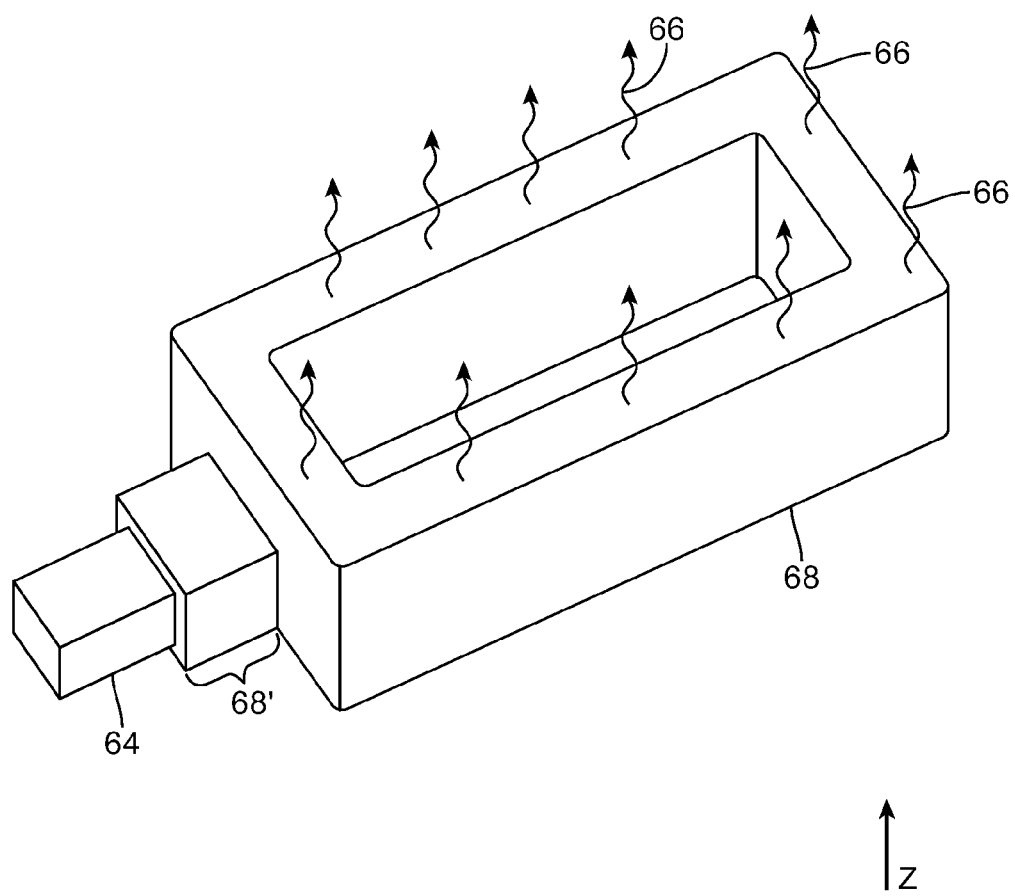
FIG. 7 is a perspective view of the illustrative camera flash structures of FIGS. 5 and 6 in accordance with an embodiment.

FIG. 7 is a perspective view of light guiding structures 68 showing how light guiding structures 68 may have an extending portion 68' that receives light 66 from light source 64. After reflecting within the interior of light guiding structures 68 (e.g., due to total internal reflection and the presence of reflective coating layer 70 (FIG. 6), light 66 is emitted upwards in direction Z to illuminate a subject that is being photographed using camera 42.

Figure 8:
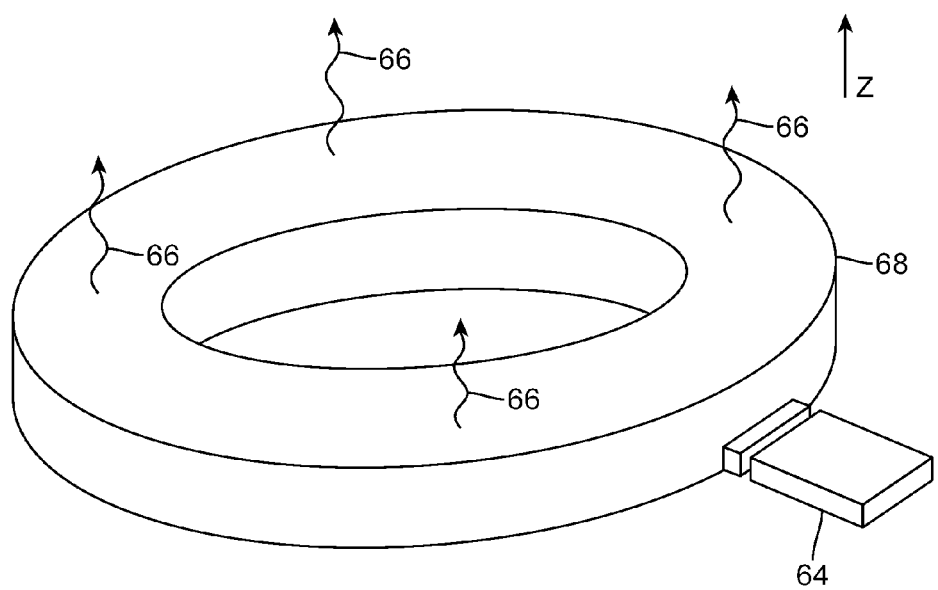
FIG. 8 is a perspective view of camera flash structures having a circular light guide ring in accordance with an embodiment.

Light guiding structures 68 may have a rectangular ring shape of the type shown in FIG. 7 to facilitate mounting in a rectangular speaker port opening 46 in a rectangular speaker port 18 (e.g., to facilitate incorporation of light guiding structures 68 and camera flash 44 into a speaker port with a rectangular shape having square or rounded ends). If desired, light guiding structures 68 may have other shapes. For example, light guiding structures 68 may have a circular ring shape, as shown in FIG. 8. Light guiding structures 68 of FIG. 8 may be used in forming camera flash structures 44 that surround camera 42, as shown in the top view of FIG. 9. With this type of configuration, light guiding structures 68 have an opening (e.g., a circular opening) in which camera 42 is located and through which camera 42 may receive image light when capturing digital images. Light guiding structures 68 with other ring shapes (e.g., the rectangular ring of FIG. 7, etc.) may also be mounted around camera 42, so that camera 42 receives image light from a subject through the opening in the center of the ring.

Figure 9:
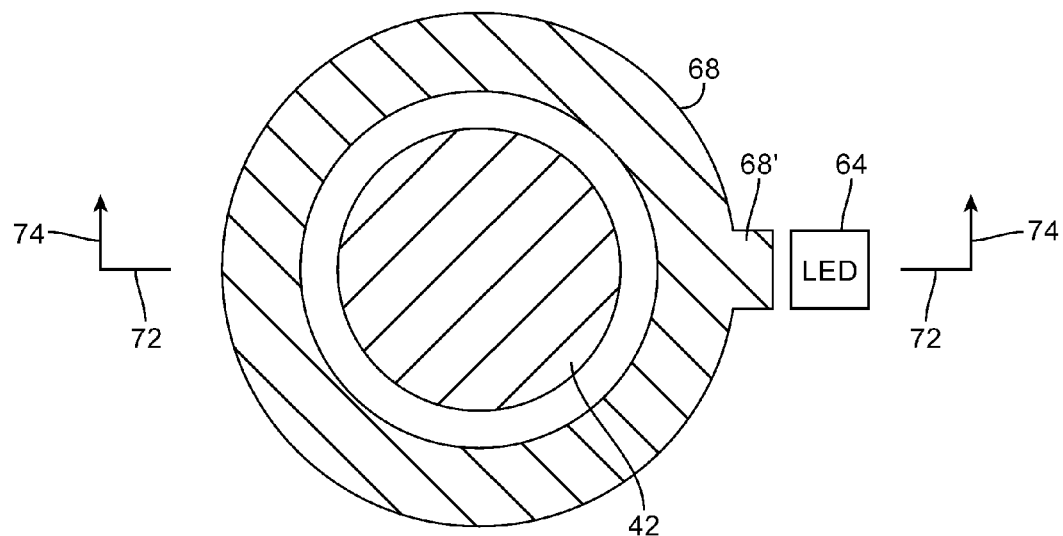
FIG. 9 is a top view of illustrative camera flash structures having circular light guide ring structures surrounding a camera so that the camera receives image light through a circular opening in the ring-shaped light guide structure in accordance with an embodiment.
Figure 10:
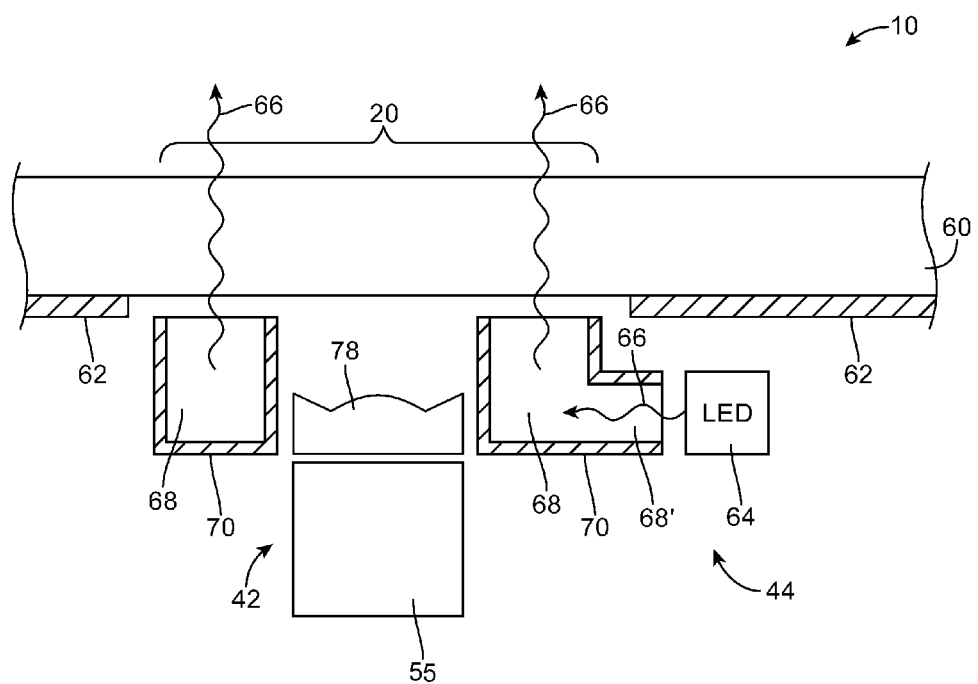
FIG. 10 is a cross-sectional side view of the illustrative camera flash structures of FIG. 9 in accordance with an embodiment.

A cross-sectional side view of camera flash structures 44 taken along line 72 of FIG. 9 and viewed in direction 74 is shown in FIG. 10. As shown in FIG. 10, light guiding structures 68 may be provided with a reflective (or light absorbing) coating such as coating 70. Coating 70 may prevent stray light from escaping from light guiding structures 68 when light source 64 launches light 66 into light guiding structures 68 via extending portion 68'. Camera 42 is surrounded by light guiding structures 68 (in the lateral dimensions running parallel to the plane of display cover layer 60).

Camera 42 has a digital image sensor such as digital image sensor 55 and lens structures such as lens structures 78. Lens structures 78 include one or more lenses for focusing image light onto digital image sensor 55. Digital image sensor 55 captures digital still and moving images of a subject through camera window 20. Camera window 20 is formed from a circular opening in opaque masking layer 62 on the inner surface of display cover layer 60. Light guiding structures 68 are aligned with window 20, so that light 66 provides subject illumination during image capture operations with camera 42.

Figure 11:
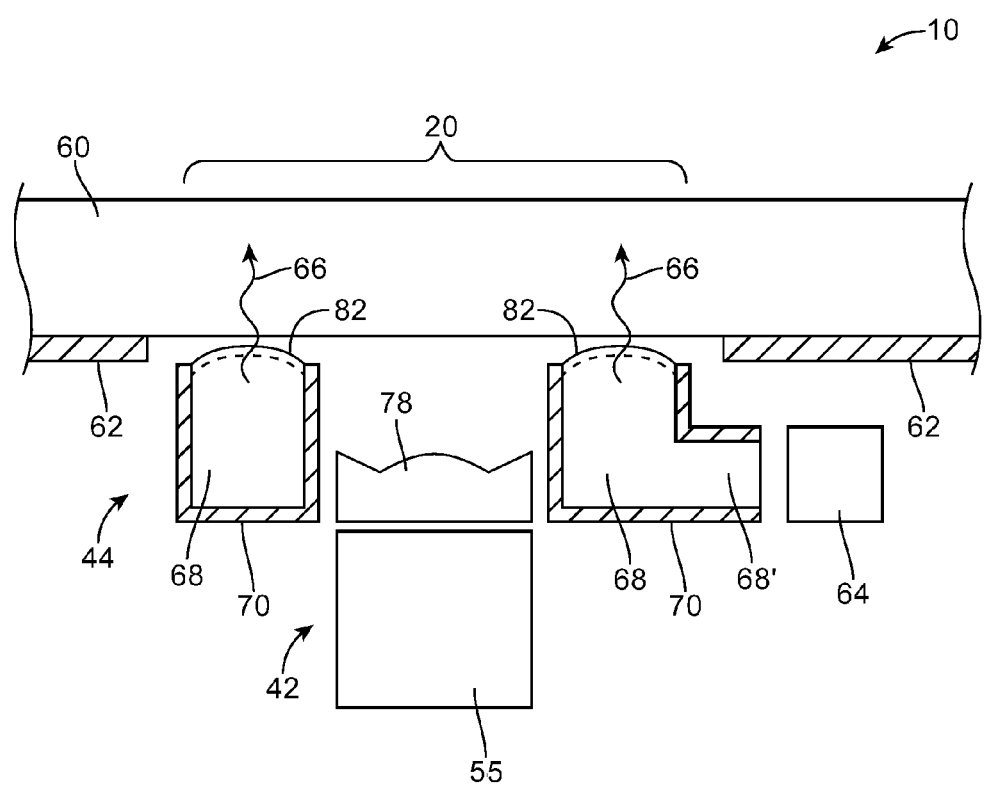
FIG. 11 is a cross-sectional side view of illustrative camera flash structures having rounded upper surfaces or other light diffusion structures to help distribute camera flash light in accordance with an embodiment.

FIG. 11 is a cross-sectional side view of camera flash structures of the type shown in FIG. 10 in a configuration in which the uppermost surfaces of light guiding structures 68 have been provided with light diffusing structures 82. Light diffusing structures 82 may include curved surfaces (as shown in FIG. 11), Fresnel lens structures, textured surfaces, or other structures that diffuse or otherwise impart an angular spread to light 66 exiting light guiding structures 68.

Figure 12:
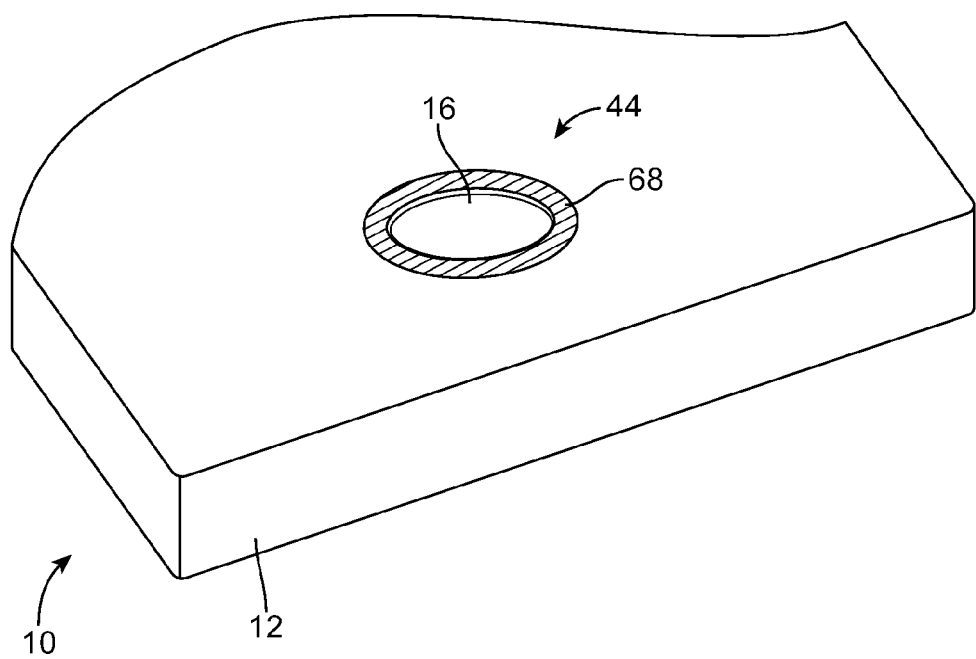
FIG. 12 is a perspective view of a portion of an electronic device having a button surrounded by light guiding structures for a camera flash in accordance with an embodiment.

If desired, camera flash structures 44 may be incorporated into button structures in device 10 such as button 16 of FIG. 1 in inactive area IA of display 14. This type of configuration is shown in FIG. 12. As shown in FIG. 12, light guiding structures 68 of camera flash structures 44 may be configured to form a ring shape that surrounds circular button 16 (i.e., button 16 may be located within the central opening of light guiding structures 68). Light guiding structures 68 may, for example, have a circular ring shape of the type shown in FIG. 8. Button 16 of FIG. 12 has a circular shape, but this is merely illustrative. Button 16 may have a rectangular shape, an oval shape, a shape with a combination of straight and curved edges, or other suitable shape. Light guiding structures 68 may have a shape that runs around the complete periphery of button 16 completely or that runs along part of the edge of button 16.

Figure 13:
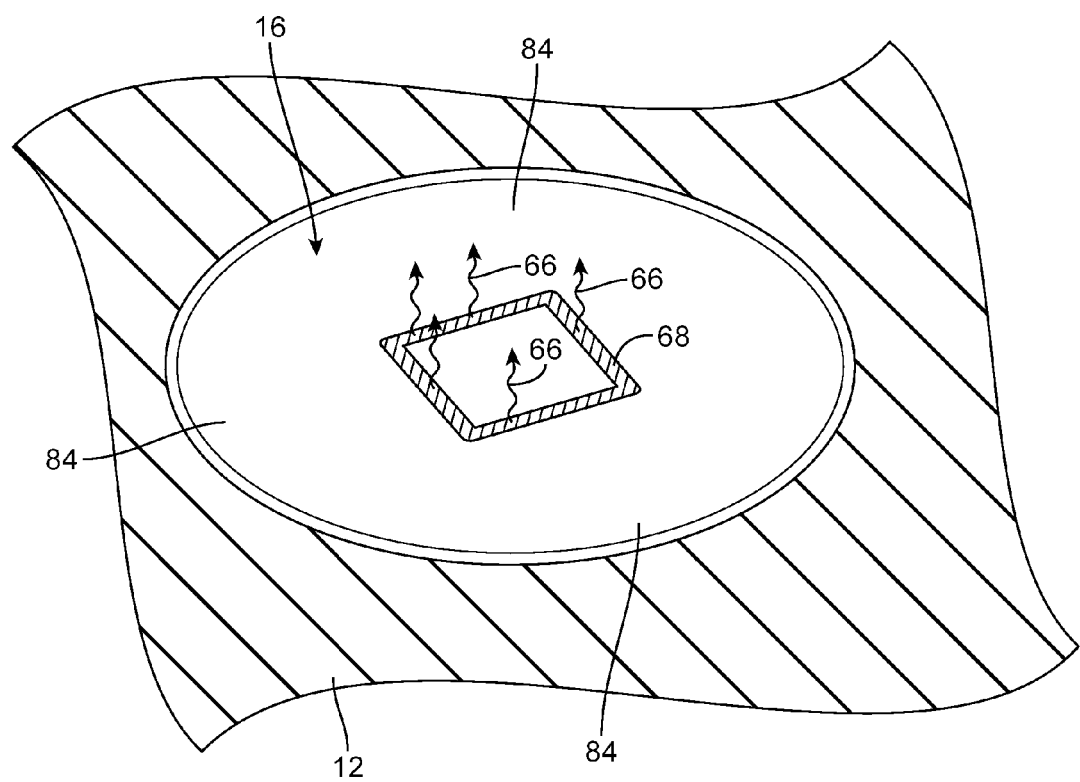
FIG. 13 is a perspective view of a portion of an electronic device having a button with a translucent area through which light for a camera flash passes in accordance with an embodiment.

In the illustrative configuration of FIG. 13, light guiding structures of camera flash 44 are formed within button 16. Button 16 may, for example, be formed from a material such as plastic. Light guiding structures 68 may be formed from clear plastic (as an example). Injection molding techniques may be used in forming the light guiding structures of FIG. 13. For example, light guiding structures 68 may be formed from a first shot of molded plastic and surrounding button portions 84 may be formed from a second shot of molded plastic. The shot of plastic used in forming button portions 84 may be an opaque plastic such as black plastic, white plastic, or plastic of other colors. With this type of arrangement, transparent button portions that form light-guiding structures 68 may be embedded within opaque button portions 84. During operation, camera flash light passes through light-guiding structures 68.

Figure 14:
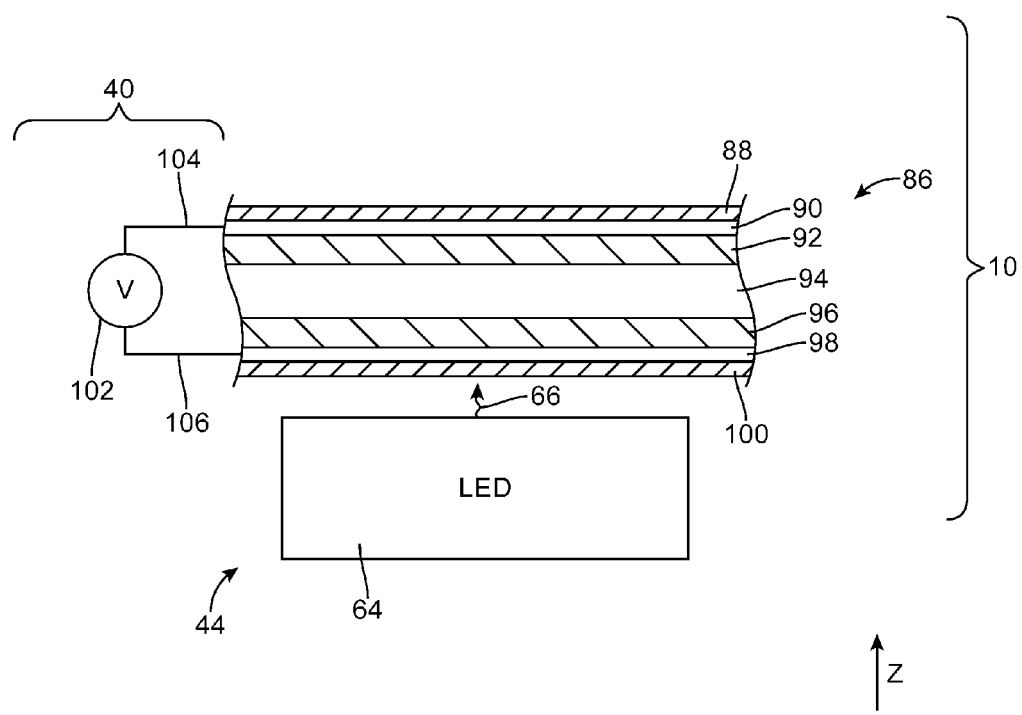
FIG. 14 is a perspective view of an illustrative electronic shutter covering a flash structure in an electronic device in accordance with an embodiment.

It may be desirable to hide camera flash structures 44 from view when not in use. Liquid crystal shutter structures may be turned on and off to selectively hide camera flash structures 44. For example, liquid crystal shutter structures such as liquid crystal shutter 86 of FIG. 14 may be placed in a transparent state to allow camera flash light to pass during camera flash use and may be placed in an opaque state to block camera flash structures 44 from view when not in use. Camera flash structures 44 of FIG. 14 include light emitting diode 64 or other light source structures. Light guiding structures 68 may be incorporated into camera flash structures 44 of FIG. 14, if desired.

During operation of camera flash structures 44, light source 64 produces camera flash light 66, while control circuitry 40 places liquid crystal shutter 86 in a transparent state to allow camera flash light 66 to exit device 10 in direction Z. Liquid crystal shutter 86 may be mounted below a window in display cover layer 60 (e.g., an opening in opaque masking layer 62) and/or may be incorporated into display cover layer 60. If desired, display 14 may be a liquid crystal display and liquid crystal shutter 86 may be formed as part of the display (e.g., by sharing substrate layers and a liquid crystal layer with the display).

Control circuitry 40 may contain circuitry such as controllable voltage source 102 for applying a controlled voltage across electrodes 90 and 98. Voltage source 102 has one terminal that is coupled to upper electrode 90 via signal path 104 and another terminal that is coupled to lower electrode 98 by signal path 106. Electrodes 90 and 98 may be formed from transparent conductive material such as layers of indium tin oxide. Electrodes 90 and 98 may be formed on transparent substrate layers such as layers of clear glass or transparent plastic. For example, upper electrode 90 may be formed on transparent substrate 92 and lower electrode 98 may be formed on transparent substrate 96.

Liquid crystal layer 94 may be interposed between substrates 92 and 96. Layers 90, 92, 94, 96, and 98 may be sandwiched between opposing polarizer layers such as lower polarizer 100 and upper polarizer 88. Voltage source 102 of control circuitry 40 controls the voltage across electrodes 90 and 98, thereby controlling the electric field strength through liquid crystal layer 94. In response to adjustments in the strength of the electric field imposed on liquid crystal layer 94, liquid crystal layer 94 controls the polarization of light 66 passing through layer 94. Due to the presence of polarizers 88 and 100, changes to the polarization of light 66 in liquid crystal layer 94 produce corresponding changes to the amount of light passing through liquid crystal shutter structures 86.

If desired, device 10 may be a cellular telephone and display 14 may be a touch screen liquid crystal display having upper and lower polarizer layers such as layers 88 and 100, a color filter layer with a substrate such as layer 90, a thin-film transistor layer with a substrate such as layer 96, and a liquid crystal layer such as portions of layer 94. With this type of arrangement, liquid crystal shutter 86 may be formed from part of the touch screen liquid crystal display (e.g., in an inactive portion of the display). Devices such as portable computers, tablet computers, and other electronic equipment with liquid crystal displays may also have display portions that form liquid crystal shutters such as liquid crystal shutter 86 of FIG. 14.

Figure 15:
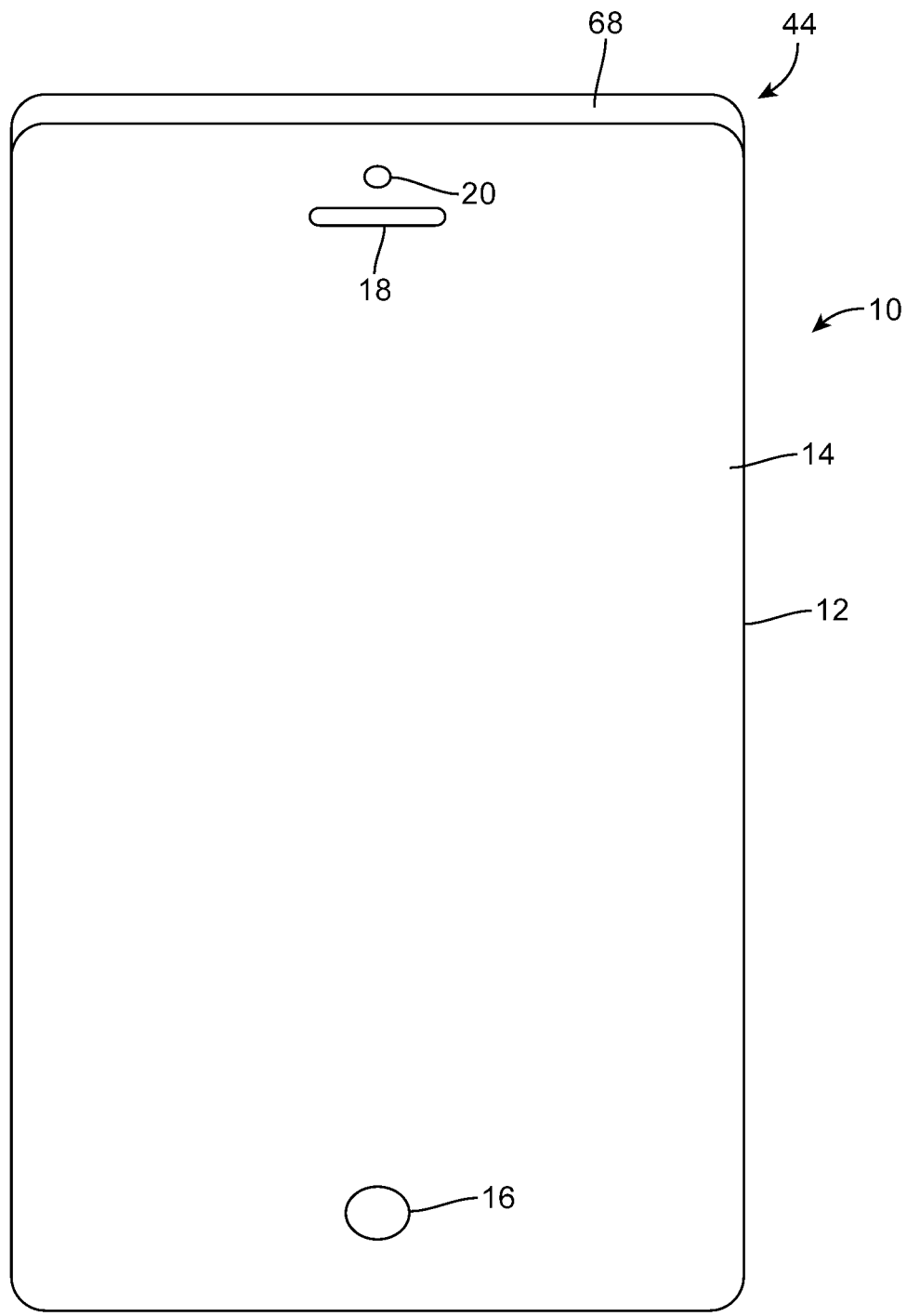
FIG. 15 is a front view of an electronic device having a camera flash structure that runs along an edge of an electronic device housing and a rectangular display mounted on the front face of the electronic device housing in accordance with an embodiment.

FIG. 15 is a front view of an illustrative electronic device in which camera flash structures 44 run along the edge of device housing 12. In the configuration of FIG. 15, light guiding structures 68 of camera flash structures 44 have been implemented using a strip of clear material such as clear plastic that runs along the upper edge of housing 12 (i.e., between the sidewalls of housing 12 and the display cover layer for display 14). If desired, light guiding structures 68 may run along the left and right edges of the display in device 10, may run along the lower edge of display 14 and device housing 12, or may run along multiple edges of display 14 and device housing 12. The example of FIG. 15 is merely illustrative.

If desired, camera flash 44 may have light guiding structures 68 that are shaped to form some or all of a logo, a decorative structure, or other patterned structure on the exterior surface of housing 12. The logo structures may be formed on the front face of device 10 (e.g., on display 14) or may be formed on a rear housing surface or other surfaces of housing 12. The logo structures may be formed from transparent plastic or other transparent material that serves as light guiding structures. A light-emitting diode or other light source 64 provides camera flash light to the light-guiding structures. During operation, the camera flash light exits the light-guiding structures (e.g., some or all of the logo) and serves as illumination for capturing digital image data.

Figure 16:
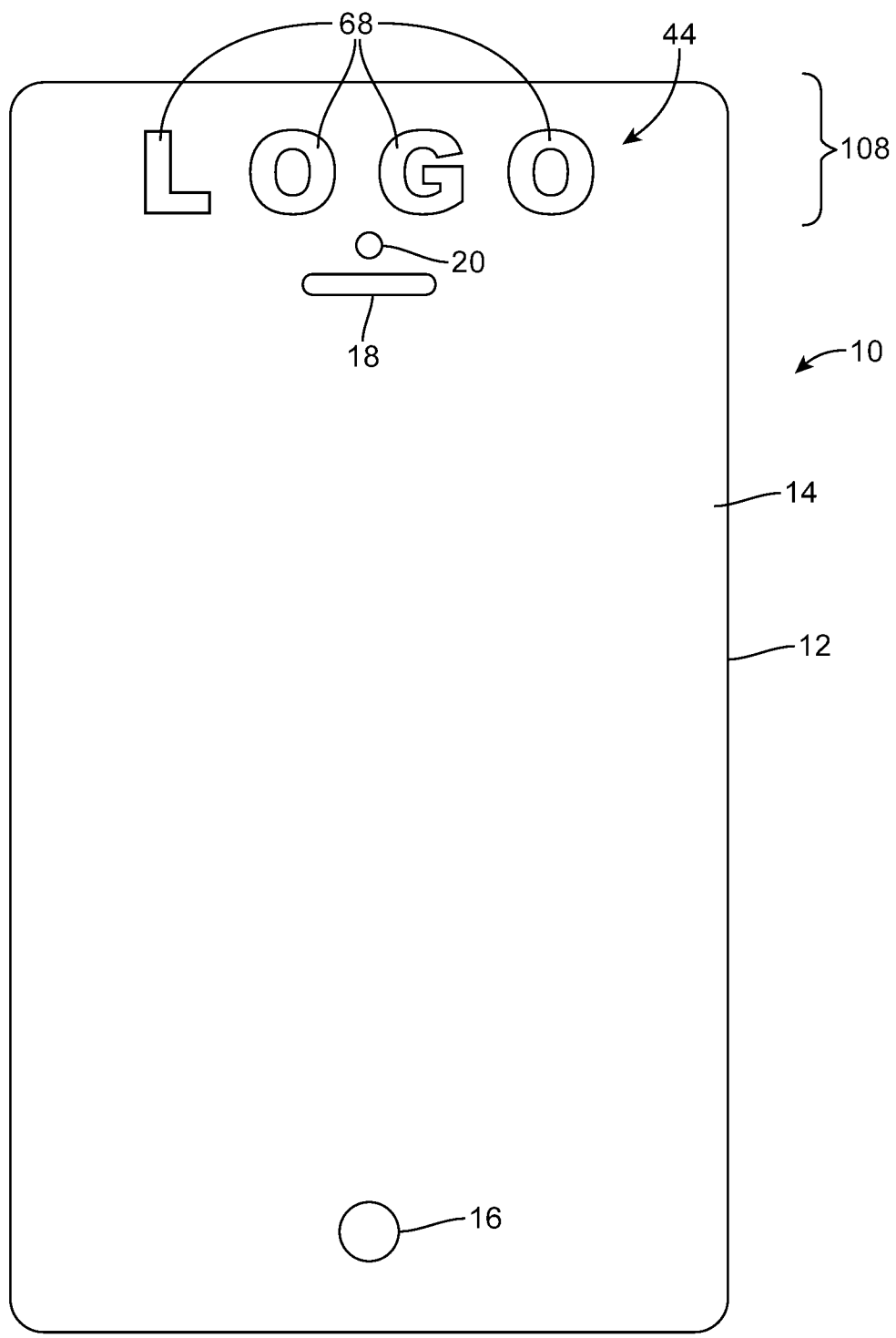
FIG. 16 is a front view of an electronic device having camera flash structures such as transparent light guide structures in the shape of a logo in accordance with an embodiment.

In the illustrative configuration of FIG. 16, portion 108 of display 14 (e.g., a portion of inactive area IA of display 14) has been provided with camera flash structure 44 that are formed from light guiding structures 68 that form some or all of a logo (e.g., text such as a name of a company or brand or other name or a shape that forms a trademark or identifier of a product, company, or service). If desired, light guiding structures 68 may be formed from other patterned shapes that do not resemble a circular flash window. Using logo-shaped light guiding structures 68 or other such patterned light guiding structures 68, a user of device 10 will generally not recognize that light guiding structures 68 form part of camera flash 44, thereby allowing camera flash 44 to be implemented in plain view on the exterior of device 10 without detracting from device aesthetics.

Figure 17:
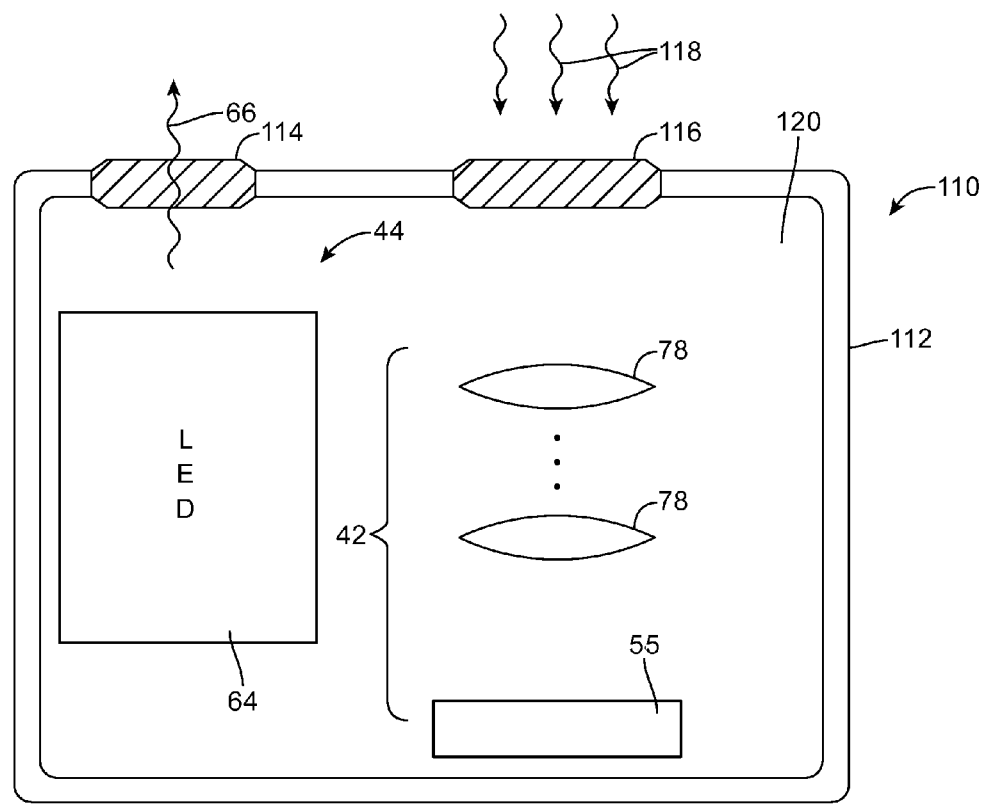
FIG. 17 is a cross-sectional side view of an electronic device camera and camera flash module having a camera formed from camera lenses and an image sensor and having a light-emitting diode in a shared housing in accordance with an embodiment.

If desired, camera 42 and camera flash 44 may be housed within a common housing to form a unitary camera and flash module. As shown in FIG. 17, camera and flash module 110 may have a housing such as housing 112. Housing 112 may be formed from one or more plastic structures, metal structures, fiber-composite structures, or other structures. As an example, housing 112 may be formed from molded plastic. Metal frame structures, brackets, component mounting structures, and other structures may be incorporated into module 110 if desired. As shown in FIG. 17, both camera flash structures 44 such as light-emitting diode 64 or other light source and camera structures 42 such as lens structures 78 and digital image sensor 55 may be housed within shared housing 112.

During operation of camera flash 44, light source 64 produces camera flash light 66. Transparent structures such as transparent structures 114 and 116 may be provided in openings in housing 112. Transparent structure 114 may allow light 66 to exit housing 112 during camera flash operations. If desired, transparent structures 114 may include light spreading structures to help ensure that camera flash light 116 is distributed over a desired range of angles. Transparent structures 114 may, for example, include Fresnel lens structures, diffusing structures such as textured surfaces, lens structures such as convex and/or concave lenses, camera flash window structures, or other structures that are transparent to camera flash light 66.

Transparent structures 116 may be aligned with lens structures 78 and digital image sensor 55 to form camera 42. Transparent structures 116 may be formed from sheets of glass or plastic or other planar camera window structures for preventing intrusions of moisture and other contaminants into interior 118 of housing 112. If desired, transparent structures 116 may include lens-shaped surfaces for focusing incoming light 118. During operation of camera 42, light 118 from the subject of an image is received by digital image sensor 55 after being focused by lens structures 78 and optionally by lens structures that are formed as integral portions of transparent structures 116. Camera 42 may then provide corresponding digital image data to control circuitry 40 (FIG. 2). The operation of camera flash 44 may be controlled by control circuitry 40 to ensure that the subject of the image is appropriately illuminated during image acquisition operations.

During operation of device 10, a light source such as light source 64 that is associated with camera flash structures 44 may produce light 66. Light 66 may be used to illuminate digital image subjects during digital image acquisition operations. If desired, light from display pixels in display 14 may provide illumination for the subjects of digital images.

In addition to serving as a camera flash to provide illumination during still and moving image capture operations, light source 64 of camera flash 44 may serve as a status indicator or other output device. For example, light source 64 may produce periodic illumination (i.e., light source 64 may blink on and off), may produce illumination with other on/off patterns, may produce constant illumination, may produce constant or blinking output with a selected peak intensity that is equal to or less than the maximum intensity of light source 64, or may produce other light output. The light output of light source 64 may be indicative of the current operating status of device 10 or may serve other output functions (e.g., constant illumination for a flashlight application). Examples of device status that may be reflected by the state of light source 64 include whether or not a message has been received, whether or not device 10 is in a sleep state, whether or not device 10 is receiving an incoming telephone call, whether or not camera 42 is actively gathering image data (e.g., as part of a video telephone call), etc.

Figure 18:
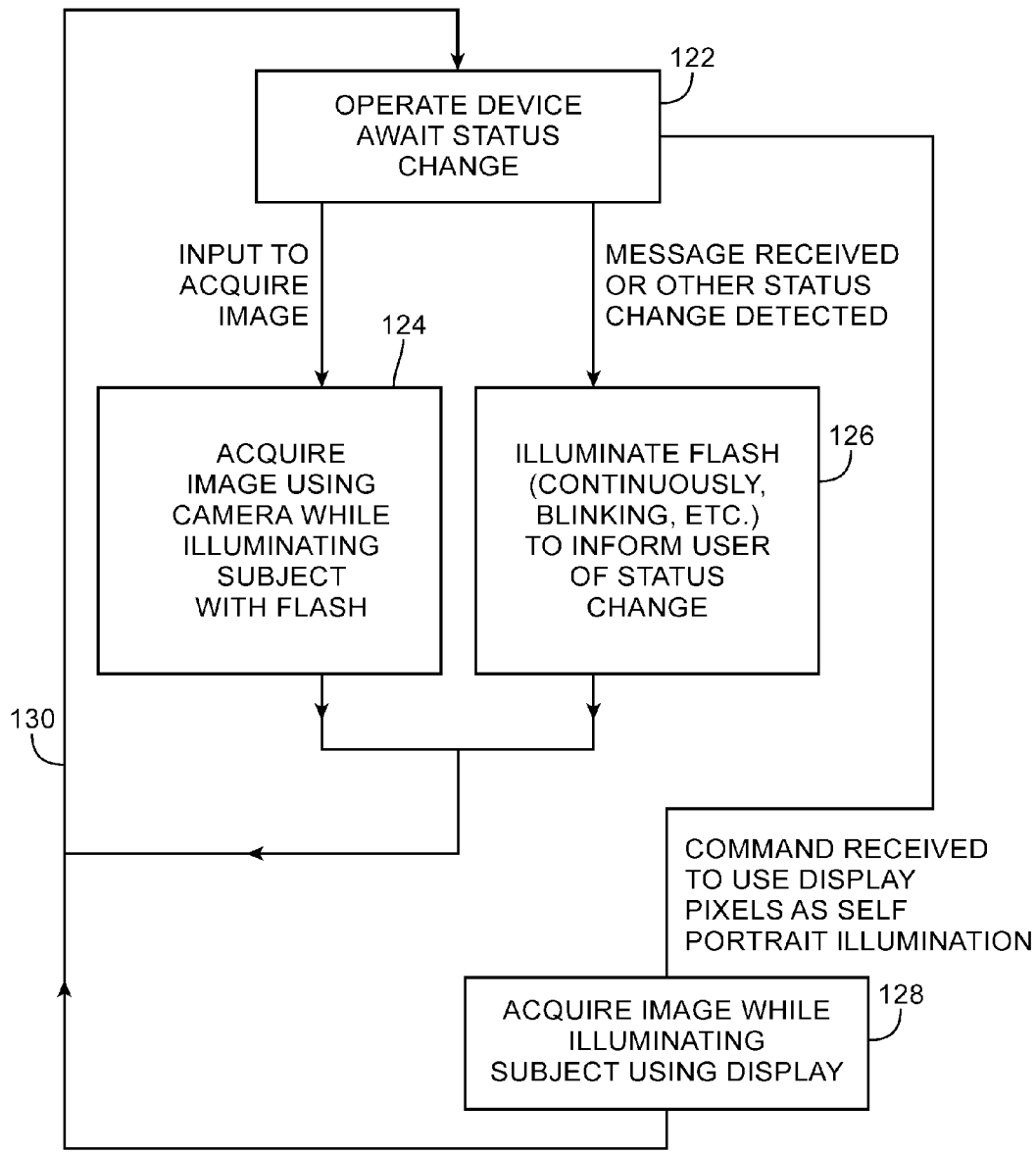
FIG. 18 is a flow chart of illustrative steps involved in operating an electronic device in accordance with an embodiment.

FIG. 18 is a flow chart of illustrative steps involved in operating optical components such as camera flash structures 44 and camera 42 in device 10.

At step 122, device 10 may be operated normally by a user. During the operations of step 122, control circuitry 40 of device 10 may await status changes associated with input-output circuitry 32 (e.g., button presses, audio input from a microphone, keyboard input, touch sensor input, camera input, sensor input, etc.) and may await status changes associated with the software running on device 10 (e.g., email and text message application status changes, web browser status changes, etc.).

In response to detection by control circuitry 40 of input that indicates that the user desires to capture an image (e.g., when a button press, touch screen input, voice command, or other input directs device 10 to capture an image) or in response to other changes in the status of software running on device 10, device 10 may, at step 124, use control circuitry 40 and input-output circuitry 32 to capture still and/or moving image data (i.e., pictures and/or video). During image capture operations, camera flash 44 may illuminate image subjects. As an example, camera 42 (e.g., a front-facing camera) and camera flash 44 (e.g., a front-facing camera flash) may be used to capture still images of the user of device 10. When capturing still images, camera flash 44 may produce a burst of illumination (i.e., camera flash 44 may produce a flash of light) to help illuminate the user or other image subject. Continuous illumination may also be provided by camera flash 44 during still image acquisition operations. When capturing moving images such as when capturing video for a video chat session or when recording a video clip, camera flash 44 may provide constant illumination for the subject of the video clip.

In response to detection of a change in operating status of device 10, device 10 may, at step 126, use camera flash 44 (i.e., light source 64) as a status indicator. For example, in response to detection of a change in the status of a communications application such as a text messaging application, email application, telephone call application, video telephone call application, or other application, control circuitry 40 may direct camera flash 44 to produce a corresponding light output (blinking, steady, output of a particular intensity to indicate status, other patterns of light at appropriate intensity levels and patterns that are indicative of operating status, etc.).

If desired, display pixels in display 14 may be used to produce illumination (e.g., white light illumination of other light) to illuminate a subject during image acquisition operations at step 128. The light that is produced by display 14 may supplement or replace the light from camera flash 44 that is used as illumination in connection with acquiring still and moving images. In a device configuration that uses only display 14 for providing subject illumination during image acquisition operations, device 10 can use display 14 to provide illumination while capturing digital image data with camera 42 in response to input from a user (e.g., a button press, touch screen command, or voice command) and/or from software running on circuitry 40. In a device configuration that uses light from display 14 to supplement light from camera flash 44, device 10 may, in response to detection of a user input command, a software command, or other input, use control circuitry 40 and camera 42 to acquire still and/or moving image data while illuminating the subject of the acquired images by turning on display 14 and camera flash 44 using control circuitry 40.

Following acquisition of images during steps 124 or 128 or following the use of light source 64 to produce light output that serves to indicate the status of device 10, processing may return to step 122, as indicated by line 130.

The foregoing is merely illustrative and various modifications can be made by those skilled in the art without departing from the scope and spirit of the described embodiments. The foregoing embodiments may be implemented individually or in any combination.

What is claimed is:

1. An electronic device, comprising:
   a housing;
   a display mounted on a front face of the housing;
   a speaker port in the display;
   a camera flash in the speaker port;
   a camera window in an inactive area of the display; and
   a camera mounted within the housing in alignment with the camera window.

2. The electronic device defined in claim 1 further comprising mesh that overlaps the speaker port and the camera flash.

3. The electronic device defined in claim 1 further comprising:
   a speaker in the speaker port; and
   mesh that covers at least the speaker.

4. The electronic device defined in claim 1 wherein the camera flash comprises:
   a light source that produces light; and
   ring-shaped light guiding structures that receive the light from the light source and direct the light outwards from the front face.

5. The electronic device defined in claim 4 further comprising a coating on the ring-shaped light-guiding structures.

6. The electronic device defined in claim 5 wherein the light source comprises a light-emitting diode and wherein the coating comprises metal.

7. An electronic device, comprising:
   a housing;
   a display mounted on a front face of the housing;
   a speaker port in the display;
   a light source that produces light;
   ring-shaped light guiding structures in the speaker port that receive the light from the light source and direct the light outwards from the front face; and
   a speaker in the speaker port, wherein the ring-shaped light guiding structures surround the speaker, wherein the ring-shaped light guiding structures have an upper surface and a lower surface, wherein the speaker has an upper surface, and wherein the upper surface of the speaker is positioned between the upper surface of the ring-shaped light guiding structures and the lower surface of the ring-shaped light guiding structures.

8. An electronic device, comprising:
   a housing;
   a display mounted on the housing that has at least one transparent layer;
   a layer of opaque masking material on an inner surface of the transparent layer, wherein the opaque masking layer has an opaque masking layer opening;
   a camera flash having a light source that produces camera flash light and ring-shaped light guiding structures that receives the camera flash light and direct the camera flash light through the opaque masking layer opening, wherein the ring-shaped light guiding structures have an opening that is aligned with the opaque masking layer opening; and
   a speaker in the opening.

9. The electronic device defined in claim 8 further comprising a coating on the light guiding structures.

10. The electronic device defined in claim 9 wherein the opening in the light guiding structures is circular and wherein the light guiding structures have an extending portion through which the camera flash light from the light source is received.

11. The electronic device defined in claim 9 wherein the light guiding structures comprise light diffusing structures that impart an angular spread on the camera flash light as the camera flash light exits the light guiding structures.

12. The electronic device defined in claim 11 wherein the light diffusing structures comprise a curved surface portion of the light guiding structures.

13. Apparatus, comprising:
a camera flash having ring-shaped light-guiding structures with an opening and a light source that produces camera flash light that passes through the ring-shaped light-guiding structures; and
a speaker located within the opening.

14. The apparatus defined in claim 13 further comprising:
an electronic device housing; and
a display mounted in the electronic device housing, wherein the speaker and camera flash are mounted in an opening in the display.

15. The apparatus defined in claim 14 further comprising a coating on the ring-shaped light guiding structures.

16. The apparatus defined in claim 15 wherein the ring-shaped light guiding structures comprise transparent plastic and wherein the coating comprises metal.

17. A method of operating an electronic device that has a display and that has control circuitry configured to control a camera and a camera flash that provides illumination for the camera during image capture operations and that is configured to control the display, the method comprising:
in response to detecting a command to use the display to provide illumination for capturing an image, capturing an image with the camera while using the control circuitry to direct the display to provide illumination for a subject of the image; and
in response to detecting a change in operating state for the electronic device with the control circuitry, providing status indicator light output to a user of the electronic device using the camera flash.

18. The method defined in claim 17 wherein the camera flash comprises a front-facing camera flash mounted on a front face of the electronic device and wherein providing the status indicator light output comprises providing light output with a pattern corresponding to the detected change in operating state.

19. The method defined in claim 18 wherein the detected change in operating state is associated with receipt of a message using the control circuitry and wherein providing the status indicator light output comprises providing light output indicative of receipt of the message.

20. The method defined in claim 19, further comprising:
in response to detection of an input to acquire an image, directing the camera to capture an image while directing the camera flash to provide illumination for the camera using the control circuitry.

21. An electronic device, comprising:
a housing;
a display mounted on a front face of the housing;
a speaker port in the display;
a camera flash in the speaker port; and
a camera in an inactive area of the display.

22. The electronic device defined in claim 21 further comprising mesh that overlaps the speaker port and the camera flash.

23. The electronic device defined in claim 21 further comprising:
a speaker in the speaker port; and
mesh that covers at least the speaker.

24. The electronic device defined in claim 21 wherein the camera flash comprises:
a light source that produces light; and
ring-shaped light guiding structures that receive the light from the light source and direct the light outwards from the front face.

25. The electronic device defined in claim 24, further comprising:
a speaker in the speaker port, wherein the ring-shaped light guiding structures surround the speaker.

26. An electronic device, comprising:
a speaker port;
a camera flash in the speaker port;
a light source that produces light;
ring-shaped light guiding structures that receive the light from the light source; and
a speaker in the speaker port, wherein the ring-shaped light guiding structures surround the speaker.

27. The electronic device defined in claim 26, further comprising:
a housing; and
a display mounted on a front face of the housing.

28. The electronic device defined in claim 27, further comprising:
a camera window in an inactive area of the display; and
a camera mounted within the housing in alignment with the camera window.

29. The electronic device defined in claim 27, further comprising a camera in an inactive area of the display.

30. The electronic device defined in claim 26 further comprising a coating on the ring-shaped light-guiding structures.

31. The electronic device defined in claim 30 wherein the light source comprises a light-emitting diode and wherein the coating comprises metal.

* * * * *